Patented Nov. 19, 1929

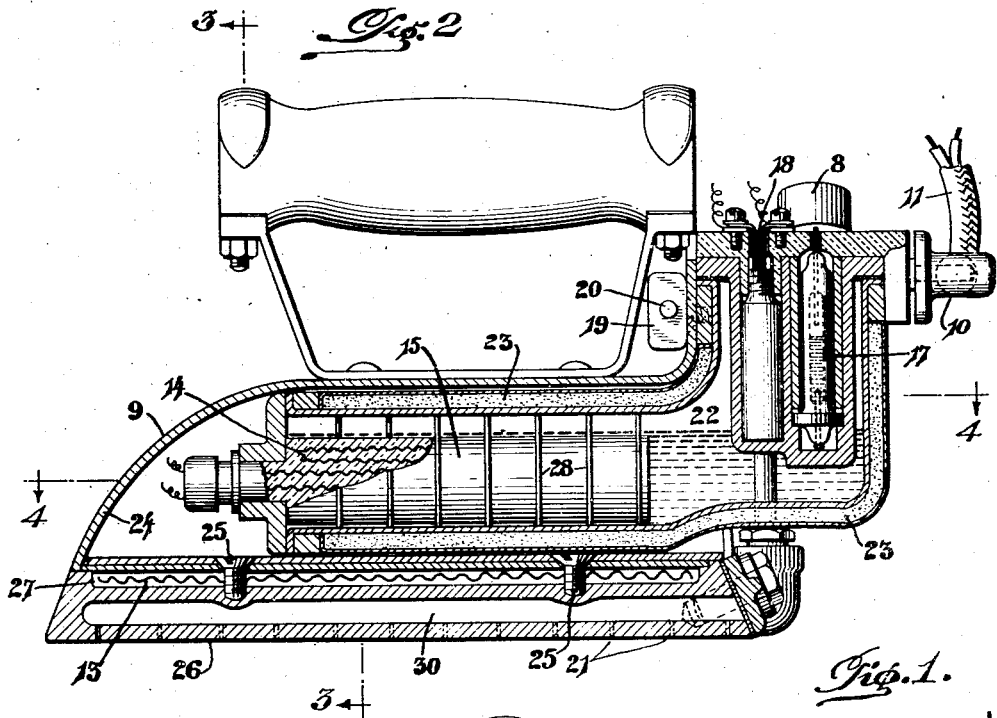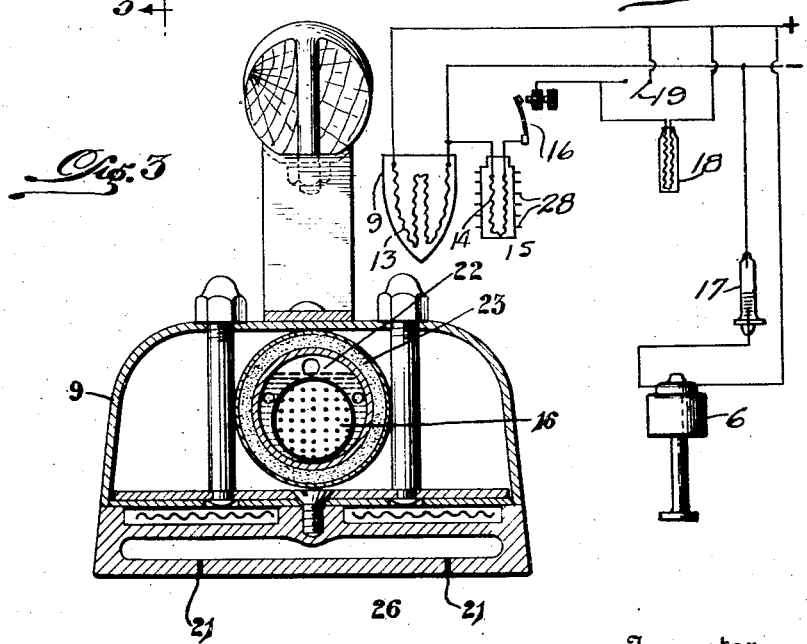

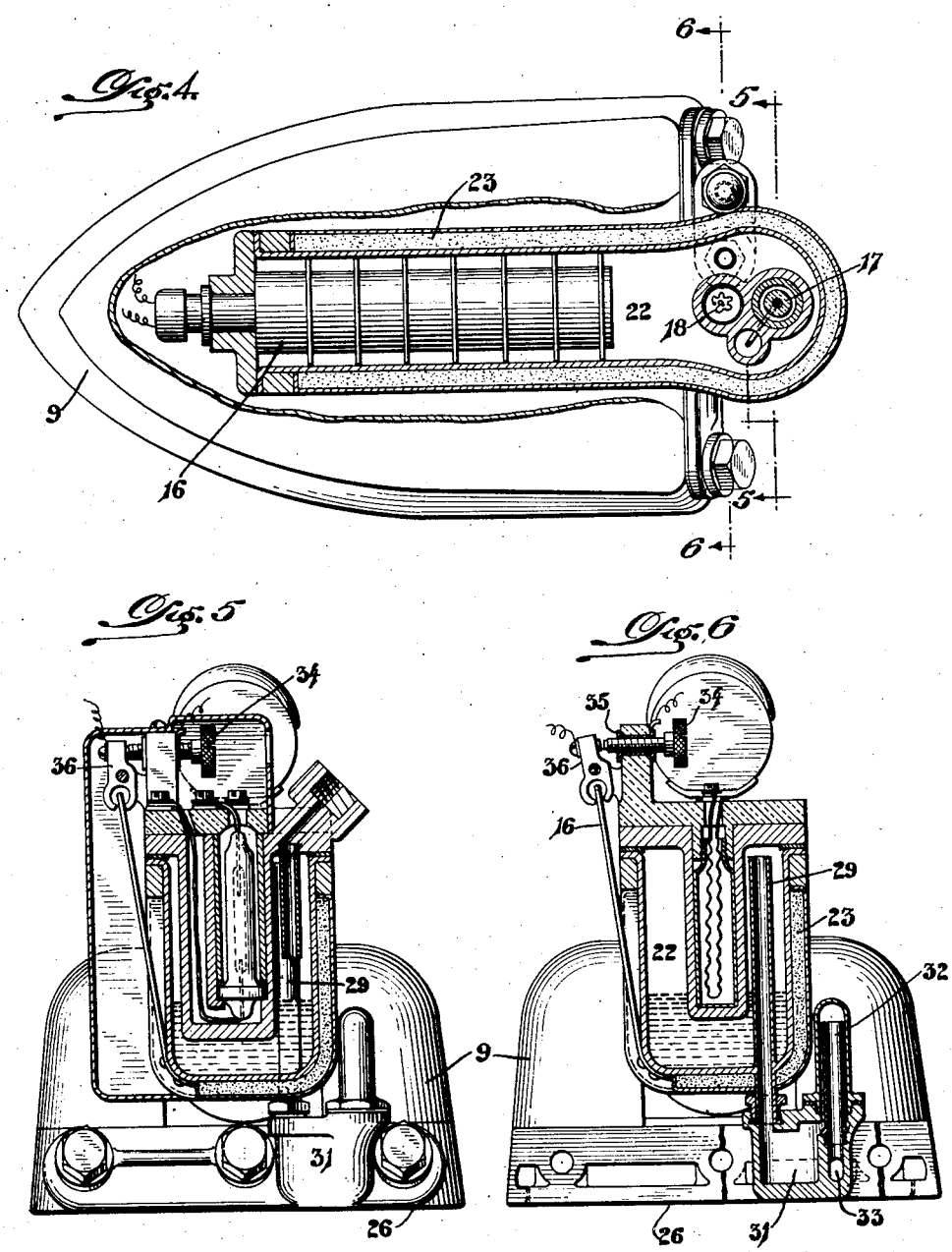

1,736,148

UNITED STATES PATENT OFFICE

CHARLES A. BREWER, OF DARIEN, CONNECTICUT, ASSIGNOR TO CANNON ENGINEERING CO., OF BROOKLYN, NEW YORK, A CORPORATION OF NEW YORK

ELECTRIC STEAM-PRESSING APPLIANCE

Application filed September 15, 1926. Serial No. 135,682.

My invention relates to electric steam pressing appliances of the kind in which the face of the pressing iron is provided with fine perforations to emit steam therethrough. The steam pressing iron according to the present invention is so constructed that at will it can be used as a "dry" iron or a steam iron. The heat to the pressing face of the iron is supplied independent of the heat supplied to the steam generating chamber contained in the iron.

For a better understanding of my invention, I refer to the annexed drawing, in which I have shown, for the purpose of illustration, an embodiment of my invention, and in which Fig. 1 shows an electric circuit diagram including the steam pressing iron, the heating element in the steam generating chamber, a thermostatic make and break switch and a feed-water pump; Fig. 2 is a longitudinal sectional view of the steam pressing iron; Fig. 3 is a transverse section through the same along line 3—3 in Fig. 2; Fig. 4 is a top plan view partly in section along line 4—4 in Fig. 2; Figs. 5 and 6 are transverse sections respectively along lines 5—5 and 6—6 in Fig. 4.

At 10 is shown a plug to be attached to the iron for supplying electric current both to the heating coil for the perforated pressing face of the iron, to the heating element in the steam generating chamber and to the feed-water pump 6. The plug 10 in turn can be connected by means of a flexible wire-cord 11 to any lamp socket.

In Fig. 1 is shown the electric circuit diagram which includes the heating coil 13 for heating the pressing face of the iron 9, the feed-water pump 6, the heating coils 14 of the heating element 15 provided in the steam generating chamber of the iron, a thermostatic circuit make and break switch 16 for controlling the temperature of the steam generating chamber, an electric heating coil 18 and a thermostatic switch 17 for closing the pump circuit. 19 is a switch adapted to be operated by a push button shown at 20 in Fig. 2.

The inner construction of the pressing iron 9 is shown in detail in Figs. 2–6. As will be seen more particularly in Figs. 2 and 3, the pressing face of the iron is provided with perforations 21 through which steam is emitted, in case steam is generated in the steam generating chamber 22 contained in the iron and surrounded by a heat-insulating material indicated at 23. The steam generating chamber 22 is located in the body part 24 of the iron to which part is detachably secured, by screws 25, or the like the perforated pressing face 26. Within a recess 27 in the upper portion thereof are located the electric heating coils 13, which, as shown in the diagrammatic Figure 1, are connected in the electric circuit so as to be supplied with electric current, as soon as the plug 10 has been inserted (Fig. 2). By said heating coils 13 "dry" heat is supplied to the perforated pressing face 26.

In the steam generating chamber 22 to which filtered water is supplied by the feed-water pump 6 is located the heating element 15 provided on its outside with ribs 28 and containing the electric heating coils 14, to which, as shown in the circuit diagram of Fig. 1, electric current is supplied upon the closing of switch 19 by means of a push-button shown in Fig. 2 at 20. As shown, the steam generating chamber 22 is not affected by the heat of the pressing face, being entirely insulated therefrom.

The feed water pump 6 is an electrically operated external pump which supplies water to chamber 22 from an external reservoir (not shown) through a flexible tube connected to the inlet shown at 8 in Fig. 2. Heat being supplied by the electric heating coil 18 included in the circuit (Fig. 1) to the thermostatic switch 17, the latter closes the circuit, and thereby pump 6 is set in operation, as the thermostatically controlled make and break switch 16 normally closes the circuit.

The steam which is generated in the steam generating chamber 22 flows through tube 29 (Figs. 5 and 6) and on its way to the chamber 30 in the pressing face 26 passes through the water trap 31, where any water particles carried by the steam are trapped and regenerated into steam, then to be carried along with the main body of steam through the pipe 32 into the passage 33 and the chamber 30 from which chamber the steam is emitted through the perforations 21 onto the material being ironed.

The thermostatic switch 16 shown in the circuit diagram of Fig. 1 can be adjusted to various temperatures in the steam generating chamber 22, which adjustment, as will be seen from Figs. 5 and 6 is effected by means of a metal set-screw 34, which passes through a bushing 35 of insulating material and forms one contact. The other contact is formed by a pivoted member 36 which is engaged by the free end of the thermostat 16 which, as shown in Figs. 5 and 6, is riveted, or otherwise secured, to one of the walls of the steam generating chamber.

A special explanation of the operation will not be necessary as the operation of my device will be sufficiently clearly understood from the drawings, and while I have shown and described in detail one embodiment of my invention, I do not, of course, wish to limit myself thereto, as it is obvious that my invention is capable of various modifications.

I claim:

1. In a pressing iron, electric heating means for the face thereof, a steam generator therein, electric heating means therefor, and means operating in response to change of temperature of the steam for controlling the operation of said generator heating means.

2. In an electric iron, a pressing face having perforations therein, an electric heating unit for the face, an electrically heated steam generating unit within the iron, means conducting steam from said unit to said face, and means responsive to the temperature of the steam generating unit for controlling the supply of feed water to said generating unit.

In testimony whereof I affix my signature.

CHARLES A. BREWER.